United States Patent [19]

Wrobel et al.

[11] Patent Number: 4,965,457
[45] Date of Patent: Oct. 23, 1990

[54] REMOVABLE PANEL ILLUMINATING MODULE

[76] Inventors: Avi Wrobel, 2404 32nd St., Santa Monica, Calif. 90405; Qamar Lodhie, P.O. Box 91072, Los Angeles, Calif. 90009; Sajid Rafique, 14705 S. Normandie Apt. 10, Gardena, Calif. 90247

[21] Appl. No.: 312,745
[22] Filed: Feb. 17, 1989
[51] Int. Cl.⁵ .................................. F21V 21/00
[52] U.S. Cl. ........................... 362/249; 362/457; 362/800
[58] Field of Search .............. 362/249, 457, 800

[56] References Cited

U.S. PATENT DOCUMENTS

| | | |
|---|---|---|
| 1,640,831 | 8/1927 | Hunt ................................. 362/362 |
| 1,977,126 | 10/1934 | Graf . | |
| 3,120,350 | 2/1964 | Muenz . | |
| 4,161,021 | 7/1979 | George, Jr. . | |
| 4,211,955 | 7/1980 | Ray . | |
| 4,298,869 | 11/1981 | Okuno ............................... 362/800 |
| 4,630,183 | 12/1986 | Fujita . | |
| 4,727,289 | 2/1988 | Uchida .............................. 362/800 |

FOREIGN PATENT DOCUMENTS 2098714 11/1982 United Kingdom ................ 362/800

Primary Examiner—Douglas Hart
Attorney, Agent, or Firm—Denton L. Anderson

[57] ABSTRACT

A removable panel-illuminating module is provided wherein the module comprises an array of light-emitting diodes. The module is quickly and easily installed and de-installed from standard panel circuitry connections without having to rotate the planar surface of the module.

18 Claims, 4 Drawing Sheets

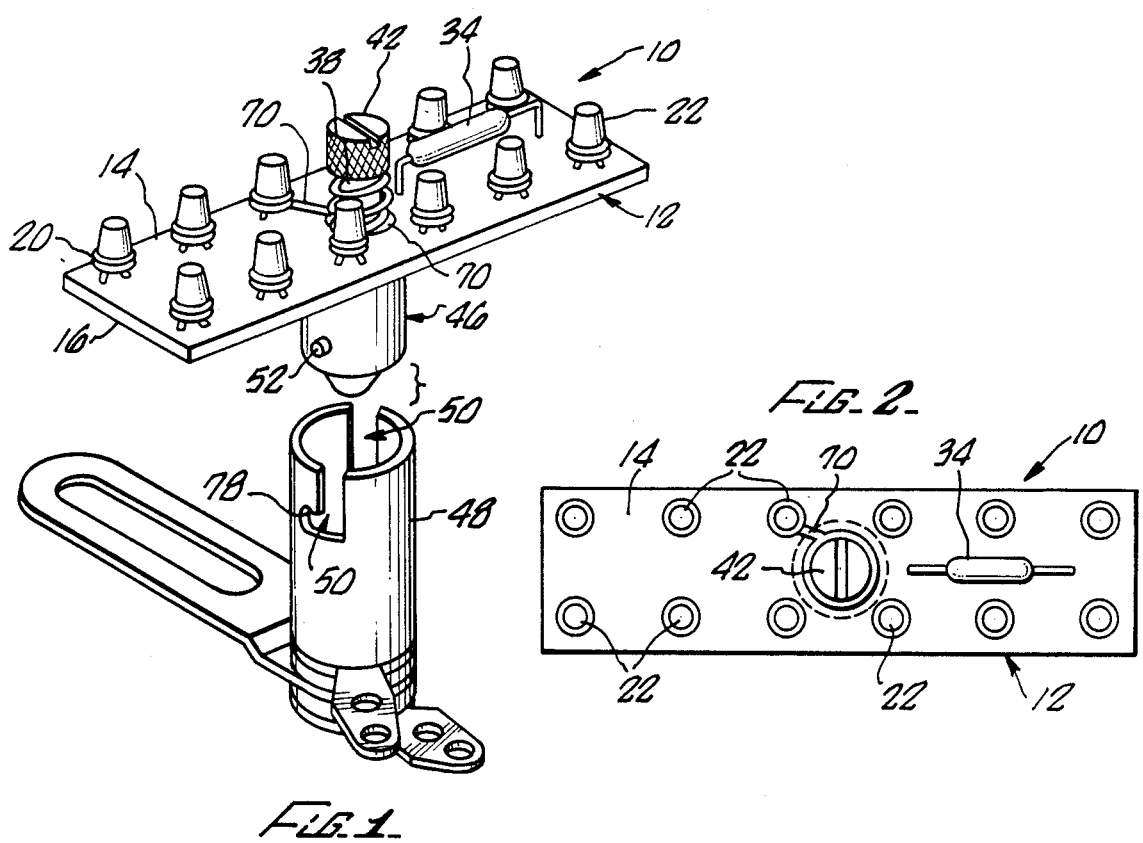
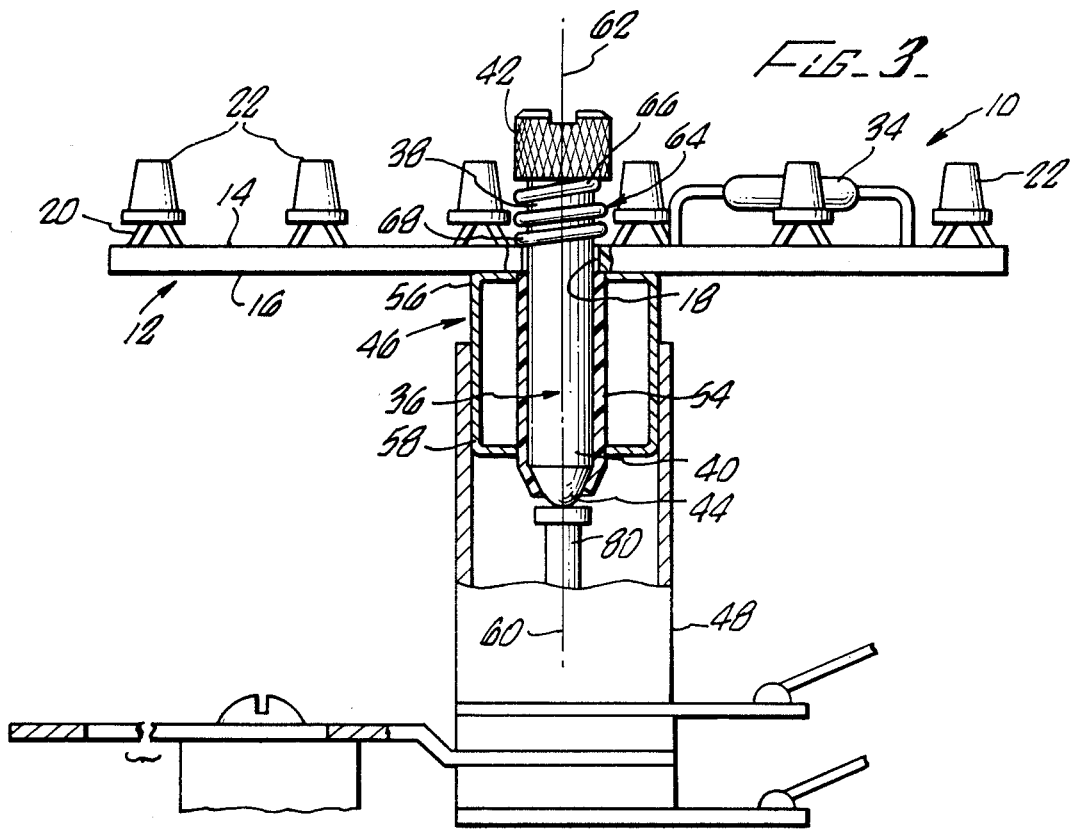

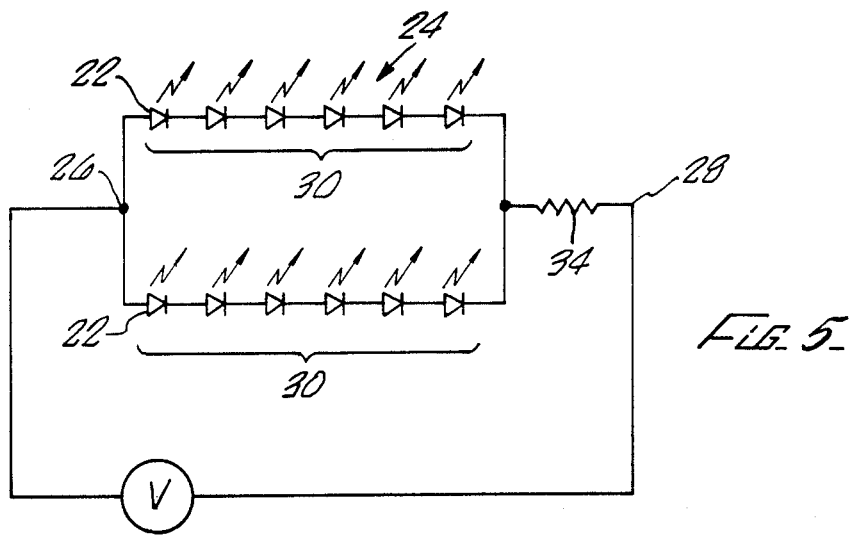
_Fig. 5_
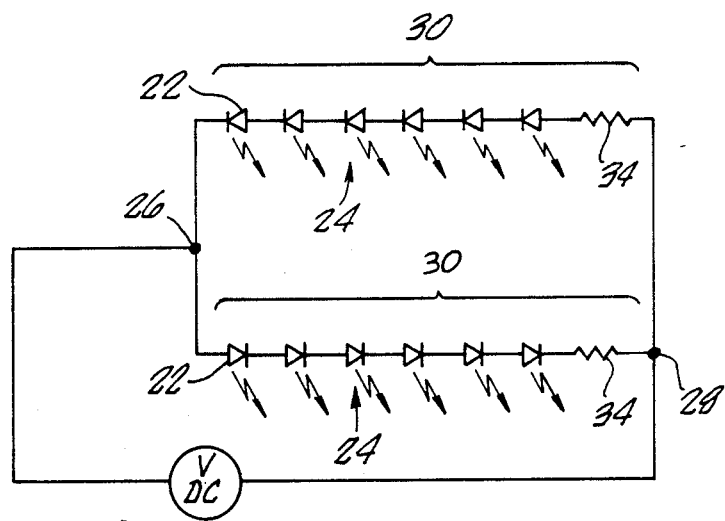
_Fig. 6_
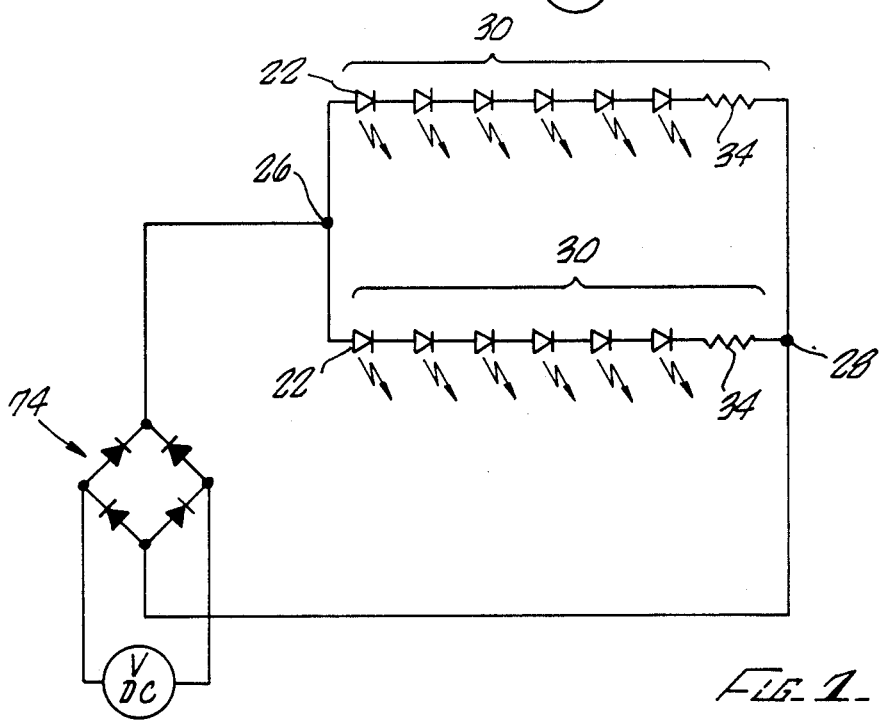
_Fig. 7_

REMOVABLE PANEL ILLUMINATING MODULE

BACKGROUND

This invention relates generally to removable devices useful in illuminating panels, and specifically to panels useful in illuminating modules which are removable and reinstallable via bayonet and/or other socket-style mounts.

Panels such as automobile dashboard panels are commonly illuminated by small, incandescent light bulbs. Such bulbs can be installed into the dashboard circuitry by a threaded male assembly (as used in large household light bulbs), but for speed and ease of installing and de-installing, the bulbs are most usually connected to the dashboard circuitry via a bayonet connection.

Light bulbs, unfortunately, have a relatively short life span. Because of vibration and environmental stresses inherent in the use in automobile dashboards, light bulbs frequently burn out after only 500 to 1,000 hours.

A light-emitting diode ("LED") typically has a life span greater than about 500,000 hours. The problem with using LEDs as panel illuminators is that the light emitted from an LED is projected in only one direction (whereas the light given off by a light bulb is emitted in all directions). Consequently, to illuminate a panel area, a plurality of LEDs spaced about the panel area must be employed.

Panel illuminating modules comprising an array of LED units have been found to provide panel area illumination equivalent to that provided by incandescent light bulbs. However, the use of such panel illuminating LED arrays has been inhibited by the difficulty in installing and de-installing such modules in the cramped panel circuitry area. Unlike the light bulbs commonly used to illuminate panels areas—which are relatively narrow—LED arrays have a relatively large surface area. This large surface area makes it difficult to install such modular arrays in the female connector element (or elements) traditionally used in panel circuitry, because the size of such arrays inhibits their rotation.

There is therefore a need for a removable panel illuminating module which can be installed and de-installed without having to rotate the module itself.

SUMMARY OF THE INVENTION

The invention satisfies this need.

The invention is a panel illuminating module and a method for using such module. The module has a planar baseboard. The baseboard has an upper baseboard surface and a parallel lower baseboard surface. At least one electrically conductive cylindrical base connector is affixed to the baseboard such that its longitudinal axis is substantially perpendicular to the plane of the baseboard. The base connector is also affixed to the baseboard in such a way that it is rotatable with respect to the plane of the baseboard. The lower base connector end is adapted to connect to a corresponding female panel connector socket. The light-emitting electrical units and the base connector are connected by suitable electrical means so that they form a closed circuit with the female panel connector socket.

In one preferred embodiment, the array of light-emitting electrical units is an array of light-emitting diodes. This embodiment of the invention provides a way to illuminate an area using high service life light-emitting diodes. The embodiment can be easily installed and de-installed from standard panel connection sockets such as T 3¼ midget bayonet sockets.

DRAWINGS

These and other features, aspects and advantages of the present invention will become understood with reference to the following description, appended claims and accompanying drawings where:

FIG. 1 is a perspective view of a removable panel-illuminating module embodying features of the invention;

FIG. 2 is a top view of the removable panel-illuminating module shown in FIG. 1;

FIG. 3 is a side view of the removable panel-illuminating module shown in FIG. 1;

FIG. 5 is a schematic drawing showing the electrical circuitry for the panel-illuminating module shown in FIG. 1;

FIG. 6 is a diagram showing an optional electrical circuitry strategy for a removable panel-illuminating module embodying features of the invention;

FIG. 7 is a diagram showing a second optional electrical circuitry strategy for a removable panel-illuminating module embodying features of the invention;

DESCRIPTION

Figure 3A:
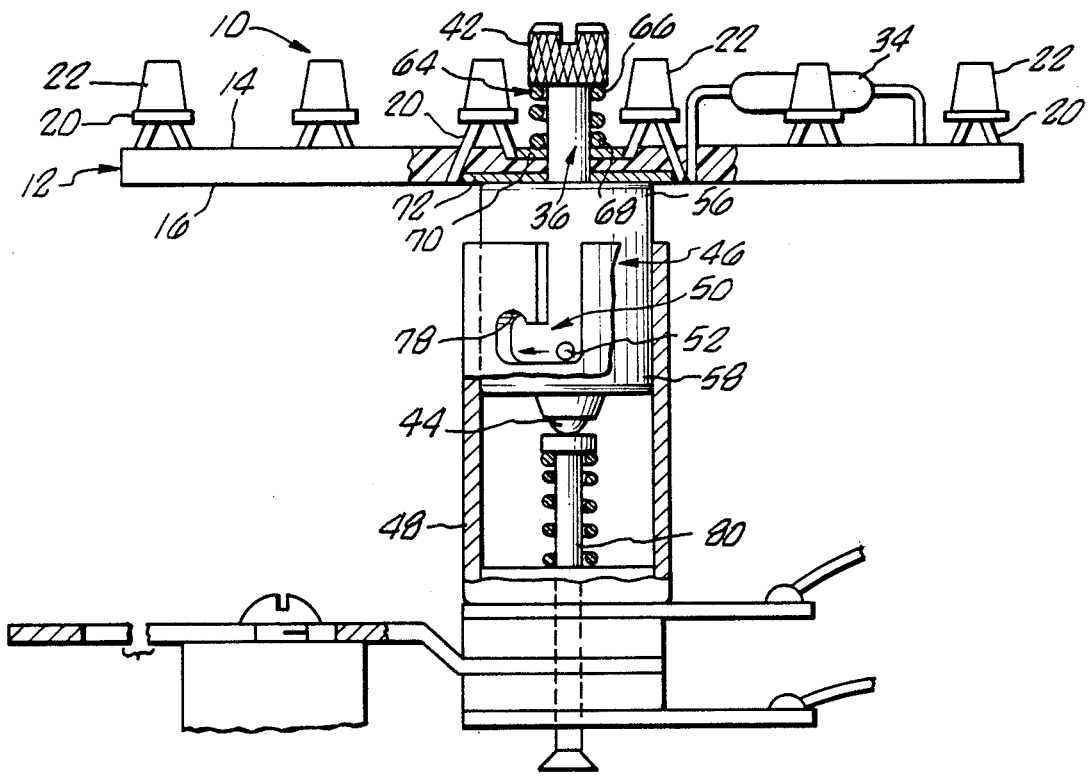
FIG. 3A is a partial cross-section of the removable panel-illuminating module shown in FIG. 1.

The invention is a panel illuminating module possessing several unique characteristics, one of the most important of which is the ability to install the module into a socket connector without having to rotate the module itself. This important feature allows the installation and de-installation of the module in cramped circuitry layouts.

Referring to FIGS. 1–4, a panel illuminating module 10 embodying features of the invention is shown in several views.

The panel illuminating module 10 comprises a planar baseboard 12 having an upper baseboard surface 14 and an approximately parallel lower baseboard surface 16. The baseboard 12 defines a baseboard opening 18 which extends orthogonally between the upper baseboard surface 14 and the lower baseboard surface 16.

The baseboard 12 also comprises a plurality of suitable receptacles 20 adapted for the installation of light-emitting units 22 such as diodes, light bulbs or other types of light-emitting electrical units.

The baseboard 12 is composed of an electrically insulating material such as wood, plastic, fiberglass, ceramic materials, etc. Preferably, for simplicity and efficiency of manufacture, the baseboard 12 is a standard printed circuitry board ("PC Board") comprising, for example, a fiberglass or ceramic planar substrate coated on its upper and lower surfaces with an electrically conducting material such as copper.

A plurality of the light-emitting electrical units 22 are installed in the light-emitting electrical unit receptacles 20 on the upper baseboard surface 14. The light-emitting electrical units 22 can be ordinary light bulbs. Preferably, the light-emitting electrical units 22 are light-emitting diodes since light-emitting diodes have a much longer service life than do ordinary light bulbs. The light-emitting diodes can be any standard light-emitting diodes known in the art. Similarly, light bulbs usable in the invention can be any of the standard miniature light bulbs available in the art.

The light-emitting electrical units 22 are electrically interconnected by standard electrical circuitry means to form an array 24 of light-emitting electrical units 22 having a single first electrical pole 26 and a single, oppositely charged second electrical pole 28.

The light-emitting electrical units 22 can be electrically connected in series, in parallel, or in several parallel banks 30 of series-connected units. One preferred embodiment comprises two banks 30 of light-emitting units 22, each bank 30 consisting of six light-emitting diodes connected in series, and the two banks 30 being connected in parallel.

The light-emitting electrical units 22 can be interconnected by any of the standard electrical circuitry methods known in the art. Wires, for example, can be used to interconnect the light-emitting electrical units 22. For maximum efficiency in the manufacturing process, it is preferred that the circuitry consist of solder trails 32 imposed on a printed circuit board surface.

One or more resistors 34 or equivalent electrical devices can be installed within the array 24 circuitry to provide a desired circuit resistance.

A shaft 36 consisting of an electrical conducting material is slidably and rotatably disposed within the baseboard opening 18 at approximately right angles to the baseboard upper surface 14 and lower surface 16. The diameter of the shaft 36 is generally slightly smaller than the diameter of the baseboard opening 18 to allow the shaft 36 to slide within the baseboard opening 18. The diameter of the shaft 36 is preferably not so much smaller than the diameter of the baseboard opening 18, however, to allow excessive play between the shaft 36 and the baseboard 12.

The shaft 36 has an upper shaft end 38 and a lower shaft end 40. The upper shaft end 38 is adapted with a shaft head 42, which shaft head 42 has a diameter greater than that of the lower shaft end 40. The shaft head 42 can be of round cylindrical shape. The shaft head 42 can also be a laterally protruding flange, which flange may be axially continuous or discontinuous.

The lower shaft end 40 is adapted with a downwardly directed electrical contact point 44 of standard shape and dimensions.

A cylindrical base connector 46 is disposed around the lower shaft end 40 above the downwardly directed electrical contact point 44. The cylindrical base connector 46 is made from an electrically conductive material such as a metal. The preferred material is brass. The base connector 46 is specially adapted to connect to a corresponding female connector socket 48. Where the corresponding female connector socket 48 is a bayonet-style connector socket having two or more bayonet-connection grooves 50 (such as connectors known in the industry as T 3¼ sockets), the base connector 46 is adapted with an equivalent number of bayonet-connection projections 52 adapted to cooperate with, and interlock within, the bayonet connection grooves 50. Where the corresponding female connector socket 48 is of a screw-in style, the base connector 46 is adapted with corresponding threads.

The diameter of the base connector 46 is larger than the diameter of the baseboard opening 18 to prevent the base connector 46 from passing through the baseboard opening 18.

The base connector 46 is electrically insulated from the shaft 36. This can be accomplished by interposing a sleeve 54 of a non-conductive material between the shaft 36 and the base connector 46.

The base connector 46 has an upper base connector end 56, a lower base connector end 58 and a longitudinal axis 60. The base connector 46 is affixed to the shaft 36 such that the longitudinal axis 60 of the base connector 46 is substantially coincident with the longitudinal axis 62 of the shaft 36. As so constructed, the smooth rotation of the shaft 36 about its longitudinal axis 62 will cause an equivalent smooth rotation of the base connector 46 about the base connector's longitudinal axis 60.

Preferably, the shaft head 42 is knurled in some way to make it easy to grip and rotate about its longitudinal axis 62. Most preferably, the shaft head 42 is knurled and in the shape of a screw or bolt head so that the shaft head 42 can be rotated with a standard screwdriver, wrench or similar tool.

The shaft 36 is made of an electrically conductive material such as a metal. The shaft 36, for example, can be made of brass.

A spring 64 is disposed around the upper shaft end 38, above the upper baseboard surface 14 and below the shaft head 42. The spring 64 can be a coiled, compressible spring. The spring 64 is composed of an electrically conductive material such as brass or other metal. The upper end 66 of the spring 64 has a diameter less than that of the shaft head 42 so that the spring 64 cannot slide over the shaft head 42. The lower end 68 of the spring 64 has a diameter larger than that of the baseboard opening 18 so that the spring 64 cannot slide through the baseboard opening 18. The spring 64 is slidably disposed about the shaft 36 such that the upper end 66 of the spring 64 impinges against the shaft head 42 and the lower spring end 68 impinges upon the upper surface 14 of the baseboard 12. The spring 64 is sufficiently long so that when disposed about the upper shaft end 38 it is in compression. In this way, the upper end 56 of the base connector 46 is urged into contact with the lower baseboard surface 16.

An upper trace conductor 70 is disposed on the upper baseboard surface 14 proximate to the baseboard opening 18 so that the lower end 68 of the spring 64 impinges the upper trace conductor 70 when the spring 64 is in compression to form a suitable electrical contact. A lower trace conductor 72 is disposed on the lower baseboard surface 16 proximate to the baseboard opening 18 in such a way that the upper end 56 of the base connector 46 when urged against the lower baseboard surface 14 impinges the lower trace conductor 72 to form a suitable electrical contact.

The upper trace conductor 70 can be disposed proximate to the baseboard opening 18 in any particular shape or pattern so long as suitable electrical contact is provided with the compressed spring 64. Preferably, for maximum electrical contact, the end of the upper trace conductor 70 proximate to the baseboard opening 18 has the shape of a concentric ring about the baseboard opening 18 of a diameter coincident with the diameter of the lower end 68 of the spring 64.

Similarly, the shape of the lower trace conductor 72 proximate to the baseboard opening 18 can be any particular shape or pattern so long as suitable electrical contact is made between the lower trace conductor 72 and the upper end 56 of the base connector 46. Preferably, for maximum electrical contact, the end of the lower trace conductor 72 proximate to the baseboard opening 18 has the shape of a concentric ring about the baseboard opening 18 of a diameter coincident with the diameter of the base connector upper end 56.

Figure 3B:
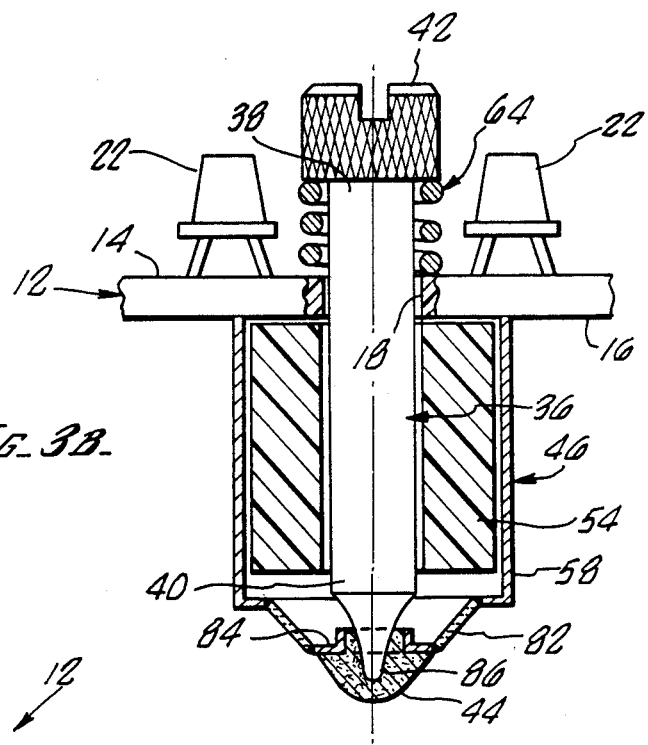
FIG. 3B is a partial cross-section of a second removable panel-illuminating module embodying features of the invention.
Figure 4:
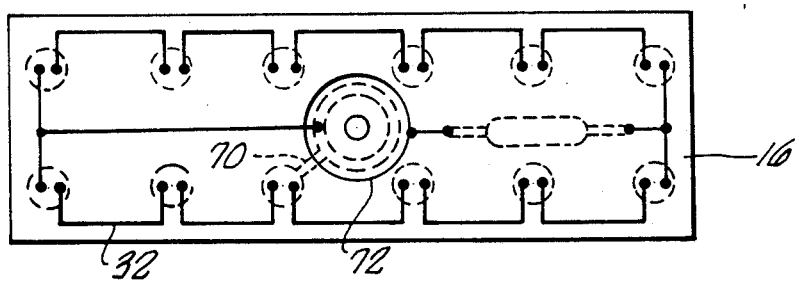
FIG. 4 is a bottom view of the removable panel-illuminating module shown in FIG. 1, wherein certain elements of the module which are disposed on the opposite side (topside) are shown in dotted.

In an alternative embodiment illustrated in FIG. 3B, the upper perimeter of a conical base insulator unit 82 is attached to the perimeter of the lower end 58 of the base connector 46. The base insulator unit 82 is composed of an electrically insulating material such as glass or other ceramic. A base center contact rivet 84, having the shape of a straight brimmed hat with a hole in the top, The LED unit banks 30 are, in turn, in series with the resistor 34.

In addition to the circuitry illustrated in FIG. 5, other circuitries may be used. For example, in FIG. 6, an alternative direct current circuitry is shown wherein twelve LED units 22 are employed in two parallel banks 30, each bank 30 containing six LED units 22 in series. Each parallel bank 30 comprises a resistor 34 in series with the LED units 22. FIG. 7 illustrates direct current electrical circuitry wherein a bridge rectifier 74 is used to create a module which is bi-polar. A bi-polar module can be used in both center-cathode and center-anode female connector units.

FIGS. 6 and 7 illustrate circuitry strategies employing two parallel banks 30, each bank 30 containing six LED units 22 in series. Other similar circuitry strategies are, of course, possible. Table I illustrates the electrical characteristics of a number of different direct current circuitry strategies.

TABLE I

| Voltage | Total # LED's | # LED's In Each Bank | # of Banks | R-OHMS RED | (Power Watts) GRN | AMB | YEL |
|---|---|---|---|---|---|---|---|
| 5 DC | 8 | 2 | 4 | 8.75 (.25) | 8.75 (.25) | 8.75 (.25) | 8.75 (.25) |
| 5 DC | 10 | 2 | 5 | 7.15 (.50) | 7.15 (.50) | 7.15 (.50) | 7.15 (.50) |
| 5 DC | 12 | 2 | 6 | 5.9 (.50) | 5.9 (.50) | 5.9 (.50) | 5.9 (.50) |
| 12 DC | 8 | 4 | 2 | 60 (.50) | 32.5 (.25) | 32.5 (.25) | 32.5 (.25) |
| 12 DC | 12 | 4 | 3 | 40 (.50) | 21.5 (.50) | 21.5 (.50) | 21.5 (.50) |
| 24 DC | 8 | 8 | 1 | 240 (.50) | 130 (.25) | 130 (.25) | 130 (.25) |
| 24 DC | 10 | 5 | 2 | 187 (1.5) | 154 (1.0) | 154 (1.0) | 154 (1.0) |
| 24 DC | 12 | 6 | 2 | 165 (1.0) | 124 (1.0) | 124 (1.0) | 124 (1.0) |
| 48 DC | 8 | 8 | 1 | 845 (1.5) | 730 (1.5) | 730 (1.5) | 730 (1.5) |
| 48 DC | 10 | 10 | 1 | 750 (1.5) | 619 (1.0) | 619 (1.0) | 619 (1.0) |
| 48 DC | 12 | 12 | 1 | 660 (1.0) | 499 (1.0) | 499 (1.0) | 499 (1.0) | is connected to the lower perimeter of the base insulator unit 82. The lower end 40 of the shaft 36 is tapered toward a point 86 which is thin enough to protrude through the center of the base center contact rivet 84. Solder is appended to the underside of the base center contact rivet 84 and shaped to form the electrical contact point 44. During the appending, the solder is caused to ooze up into the center of the base center contact rivet 84 to establish firm electrical contact with the lower end 40 of the shaft 36.

The electrical circuitry for the embodiment illustrated in FIGS. 1-4 is shown in diagrammatic form in FIG. 5 for a direct current power supply. Twelve LED units 22 are electrically arranged in two parallel banks 30, each bank 30 consisting of six LED units 22 in series.

In addition to the circuitry illustrated in FIGS. 5-7, circuitries may be used for alternating current power supplies. For example, in FIG. 8, an alternating current circuitry is shown wherein twelve LED units 22 are employed in two parallel banks 30, each bank 30 containing six LED units 22 in series. Each parallel bank 30 comprises a resistor 34 in series with the LED units 22. FIG. 9 illustrates an alternating current electrical circuitry wherein a full-wave diode bridge rectifier 76 is used to create a module which is bi-polar.

Figure 8:
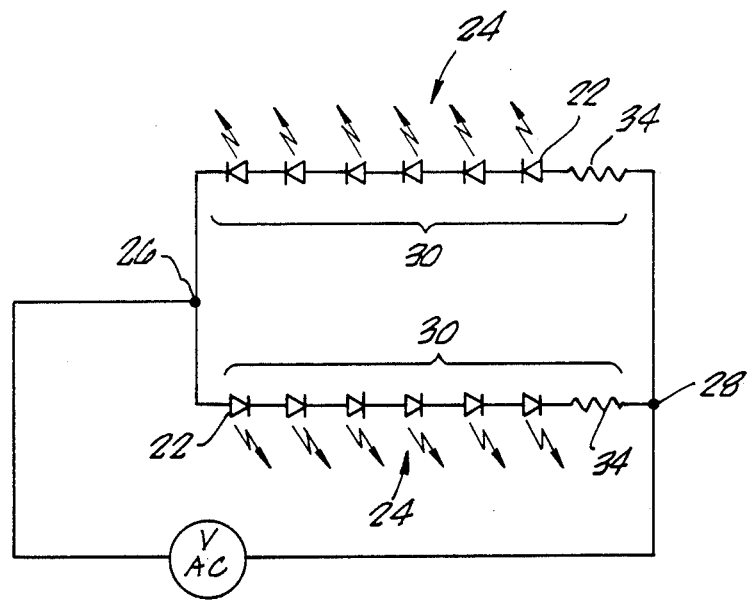
FIG. 8 is a diagram of a third optional electrical circuitry strategy for a removable panel-illuminating module embodying features of the invention.
Figure 9:
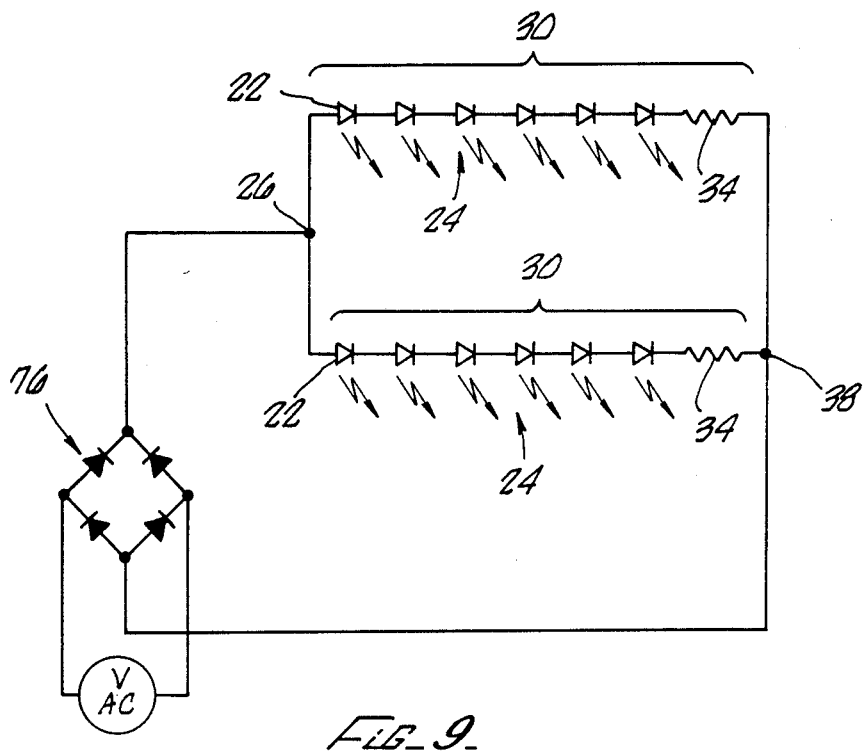
FIG. 9 is a diagram of a fourth optional electrical circuitry strategy for a removable panel-illuminating module embodying features of the invention.

FIGS. 8 and 9 illustrate circuitry strategies employing two parallel banks 30, each bank containing six LED units in series. Other similar circuitry strategies are, of course, possible. Table II illustrates the electrical characteristics of a number of different alternating current circuitry strategies.

TABLE II

| Voltage | Total # LED's | # LED's In Each Bank | # of Banks | R-OHMS RED | (Power Watts) GRN | AMB | YEL |
|---|---|---|---|---|---|---|---|
| 6.3 AC | 8 | 2 | 4 | 16.9 (.50) | 10.0 (.25) | 10.0 (.25) | 10.0 (.25) |
| 6.3 AC | 12 | 2 | 6 | 11.3 (.50) | 6.65 (.50) | 6.65 (.50) | 6.65 (.50) |
| 12 AC | 8 | 2 | 4 | 52.3 | 45.3 | 45.3 | 45.3 |

TABLE II-continued

| Voltage | Total # LED's | # LED's In Each Bank | # of Banks | R-OHMS RED | (Power Watts) GRN | AMB | YEL |
|---|---|---|---|---|---|---|---|
| | | | | (1.5) | (1.5) | (1.5) | (1.5) |
| 12 AC | 12 | 3 | 4 | 41.2 | 30.9 | 30.9 | 30.9 |
| | | | | (1.0) | (1.0) | (1.0) | (1.0) |
| 24 AC | 8 | 8 | 1 | 243 | 130 | 130 | 130 |
| | | | | (.50) | (.25) | (.25) | (.25) |
| 24 AC | 10 | 5 | 2 | 187 | 154 | 154 | 154 |
| | | | | (1.5) | (1.0) | (1.0) | (1.0) |
| 24 AC | 12 | 6 | 2 | 165 | 124 | 124 | 124 |
| | | | | (1.0) | (1.0) | (1.0) | (1.0) |
| 48 AC | 8 | 8 | 1 | 845 | 732 | 732 | 732 |
| | | | | (1.5) | (1.5) | (1.5) | (1.5) |
| 48 AC | 10 | 10 | 1 | 750 | 619 | 619 | 619 |
| | | | | (1.5) | (1.0) | (1.0) | (1.0) |
| 48 AC | 12 | 12 | 1 | 665 | 499 | 499 | 499 |
| | | | | (1.0) | (1.0) | (1.0) | (1.0) |

For applications using alternating current power sources, two circuitry strategies are available for modules having a number of parallel banks 30. In one strategy, half of the parallel banks 30 have complementary polarity. In the second strategy, a full-wave diode bridge rectifier 76 is inserted into the circuitry as illustrated in FIG. 9.

In operation, the panel-illuminating module 10 is installed into a suitable socket connector 48 by directing the lower end of the base connector 46 into the socket connector 48. The shaft head 42 is slightly rotated until the lateral bayonet connection projections 54 are directed into the socket connector bayonet connection grooves 50. The shaft head 42 is then pushed against the compression tension of the spring 64 so that the base connector 46 is thrust deeper into the socket connector 48. The shaft head 42 is then further rotated so that the lateral bayonet connection projections 52 rotate to the lateral-most end 78 of the socket connector bayonet connection grooves 50. The shaft head 42 is then released allowing the spring 64 to again urge the upper end of the base connector 46 against the lower trace conductor 72.

After being installed as described in the previous paragraph, the downwardly directed electrical contact 44 is in contact with the socket connector contact post 80. Also, the base connector 46 is in electrical contact with the sides of the socket connector 48.

To activate the panel-illuminating module, an electrical potential is created between the sides of the connector socket 48 and the base connector socket post 80. This electrical potential causes current to flow from the sides of the socket connector 48 to the base connector 46, through the base connector 46 to the lower trace conductor 72, through the lower trace conductor 72 to the array 30 of light-emitting units 22, through the light-emitting units 22 to the upper trace conductor 70, through the upper trace conductor 70 to the lower end 68 of the spring 64, through the spring 64 to the shaft head 42, through the shaft 36 to the downwardly directed electrical contact 44, and from the downwardly directed electrical contact 44 to the central contact post 80.

The flow of electricity through the array 30 of light-emitting units 22 causes the light-emitting units 22 to emit light, thereby illuminating an area at least as large as the upper baseboard surface 14.

To disconnect the panel-illuminating module 10, the connection steps described above are simply reversed.

Note that in neither the connection steps nor in the disconnection steps is it necessary to rotate the baseboard 12. The only rotation required is that of the base connector 46 by rotating the shaft head 42. This feature allows even large and awkwardly shaped modules 10 to be installed within cramped and narrowly defined locations in the panel circuitry.

An additional advantage inherent in the panel-illuminating module 10 of the invention is that, where the base-connection socket 48 is of a bayonet style, the panel-illuminating module 10 can be installed by merely lining up the lateral bayonet connection projections 52 with the socket connector bayonet connection grooves 50 and then thrusting the shaft head 42 against the compression tension of the spring 64. The socket connector bayonet connection grooves 50 are generally curved to cause the lateral bayonet connection projections 52 to automatically rotate into the lateral most end 78 of the socket connector bayonet connection grooves 50 "snap-on" style.

Another advantage inherent in the invention is that, in those invention embodiments having parallel banks 30 of light emitting electrical units 22, the failure of any light-emitting unit 22 in any one of the banks 30 will not cause the panel-illuminating module 10 to totally fail. Only the bank 30 of light-emitting electrical units 22 wherein the failed unit is disposed will fail. Such redundancy is not possible when using the single light bulbs of the prior art.

EXAMPLE

In an illustrative example embodiment of a removable panel illuminating module of the invention, the baseboard is a standard PC board made of copper-coated fiberglass. Circuitry paths are made on the board with copper traces coated with tin/lead solder. The baseboard is rectangular, having a length of 2.125 inches and a width of 0.562 inches.

The base connector is a standard MB 400 (T 3 1/4 midget bayonet socket) connector.

The insulating sleeve is made of epoxy or glass-filled nylon. The insulating sleeve has an inside diameter of 0.155 inches, an outside diameter of 0.342 inches, and a length of 0.23 inches.

The shaft is made of brass. Its overall length is 0.80 inches. The head portion of the shaft is 0.10 inches in length. The shaft has a nominal diameter of 0.152 inches. The head portion of the shaft has a diameter of 0.25 inches. The lowermost tip of the shaft has a diameter of 0.047 inches and a length of 0.120 inches.

The spring is constructed of phosphor bronze. It is 0.45 inches long. It has an outside diameter of 0.20 inches. The spring has five coils and a closed end. It is constructed of wire having a diameter of 0.020 inches.

Twelve red LED units are used, two parallel banks of six LED units in series. Each of the LED units is a standard 125-FPCX midget light emitting diode.

A single resistor is used in series with the LED array. The resistor is rated at a hundred sixty-five ohms, 1.0 watts.

When installed in a panel powered by direct current having a voltage of 24, the unit uses 73 milliamps of current and produces 1,000 millicandelas of light.

Although the present invention has been described in considerable detail with reference to certain preferred versions, many other versions should be apparent to those skilled in the art. Therefore, the spirit and scope of the appended claims should not necessarily be limited to the description of the preferred versions contained therein.

What is claimed is:

1. A panel illuminating module comprising:
   (a) a planar baseboard having an upper baseboard surface and a parallel lower baseboard surface;
   (b) a plurality of light-emitting electrical units affixed to the upper baseboard surface, the light-emitting electrical units being electrically interconnected to form an array having opposite electrical poles;
   (c) an electrically conductive cylindrical base connector adapted to connect to a corresponding female connector socket having oppositely charged electrical poles, the base connector being affixed to the baseboard such that its longitudinal axis is substantially perpendicular to the plane of the baseboard; and
   (d) means for electrically connecting the light-emitting electrical units to form a closed circuit with the oppositely charged poles of the female connector; wherein the base connector is rotatable about its longitudinal axis while the baseboard is kept stationary.

2. The panel illuminating module described in claim 1 further comprising a resistor electrically connected within the circuit.

3. The panel illuminating module described in claim 1 wherein the light-emitting electrical units are light-emitting diodes.

4. A panel illuminating module comprising:
   (a) a planar baseboard having an upper baseboard surface and a parallel lower baseboard surface, the baseboard having a baseboard opening extending between the upper baseboard surface and the lower baseboard surface;
   (b) a plurality of light-emitting electrical units affixed to the upper baseboard surface, the light-emitting electrical units being electrically interconnected to form an array, the array having opposite electrical poles;
   (c) an electrically conductive upper trace conductor affixed to the upper baseboard surface, the upper trace conductor being electrically connected at its one end to a first of the two array electrical poles and terminating at its other end proximate to the baseboard opening;
   (d) an electrically conductive lower trace conductor affixed to the lower baseboard surface, the lower trace conductor being electrically connected at its one end to the second of the two array electrical poles and terminating at its other end proximate to the baseboard opening;
   (e) an electrically conductive shaft having an upper shaft end and a lower shaft end, the upper shaft end being adapted with a shaft head of greater diameter than that of the baseboard opening, the shaft being slidably and rotatably disposed within the baseboard opening, the lower shaft end being adapted with a downwardly directed electrical contact point;
   (f) an electrically conductive cylindrical base connector having an upper base connector end with a diameter greater than that of the baseboard opening and a lower base connector end adapted to connect to a corresponding female connector socket, the base connector being affixed around, and electrically insulated from, the lower shaft end such that the longitudinal axis of the base connector is substantially coincident with the longitudinal axis of the shaft;
   (g) an electrically conductive coiled spring having an upper spring end with a diameter less than that of the shaft head and a lower spring end with a diameter greater than that of the baseboard opening, the spring being slidably affixed around the upper shaft end such that the lower spring end impinges the upper trace conductor and the upper spring end impinges the underside of the shaft head, the spring being adapted to urge the upper base connector end against the lower trace conductor; wherein the base connector can be rotated about its longitudinal axis by rotating the shaft head, and
   wherein electrical current can be caused to flow through the base connector to the lower trace conductor, through the lower trace conductor to the array of light-emitting electrical units, through the array of light-emitting electrical units to the upper trace conductor, through the upper trace conductor to the coiled spring, through the coiled spring to the shaft, and through the shaft to the downwardly directed electrical contact point.

5. The panel illuminating module described in claim 4 further comprising a resistor electrically connected within the circuit.

6. The panel illuminating module described in claim 4 wherein the light-emitting electrical units are light-emitting diodes.

7. A method of illuminating an area comprising the steps of:
   (a) inserting a panel illuminating module into a corresponding female connector socket, wherein the female connector socket has sides and a central contact post and wherein the panel illuminating module comprises:
      (i) a planar baseboard having an upper baseboard surface and a parallel lower baseboard surface;
      (ii) a plurality of light-emitting electrical units affixed to the upper baseboard surface, the light-emitting electrical units being electrically interconnected to form an array having opposite electrical poles;
      (iii) an electrically conductive cylindrical base connector adapted to connected to a corresponding female connector socket having oppositely charged electrical poles, the base connector being affixed to the baseboard such that its longitudinal axis is substantially perpendicular to the plane of the baseboard; and (iv) means for electrically connecting the light-emitting electrical units to form a closed circuit with the oppositely-charged poles of the female connector; wherein the base connector is rotatable about its longitudinal axis while the baseboard is kept stationary; and (b) creating an electrical potential between the sides of the connector socket and the central contact post.

8. The illuminating method of claim 7 wherein the light-emitting electrical units are light-emitting diodes.

9. A method of illuminating an area comprising the steps of:

(a) inserting a panel illuminating module into a corresponding female connector socket, wherein the female connector socket has sides and a central contract post and wherein the panel illuminating module comprises:

(i) a planar baseboard having an upper baseboard surface and a parallel lower baseboard surface, the baseboard having a baseboard opening extending between the upper baseboard surface and the lower baseboard surface;

(ii) a plurality of light-emitting electrical units affixed to the upper baseboard surface, the light-emitting electrical units being electrically interconnected to form an array, the array having opposite electrical poles;

(iii) an electrically conductive upper trace conductor affixed to the upper baseboard surface, the upper trace conductor being electrically connected at its one end to a first of the two array electrical poles and terminating at its other end proximate to the baseboard opening;

(iv) an electrically conductive lower trace conductor affixed to the lower baseboard surface, the lower trace conductor being electrically connected at its one end to the second of the two array electrical poles and terminating at its other end proximity to the baseboard opening;

(v) an electrical conductive shaft having an upper shaft end and a lower shaft end, the upper shaft end being adapted with a shaft head of greater diameter than that of the baseboard opening, the shaft being slidably and rotatably disposed within the baseboard opening, the lower shaft end being adapted with a downwardly directed electrical contact point;

(vi) en electrically conductive cylindrical base connector having an upper base connector end with a diameter greater than that of the baseboard opening and a lower base connector end adapted to connect to a corresponding female connector socket, the base connector being affixed around, and electrically insulated from, the lower shaft end such that the longitudinal axis of the base connector is substantially coincident with the longitudinal axis of the shaft;

(vi) an electrically conductive coiled spring having an upper spring end with a diameter less than that of the shaft head and a lower spring end with a diameter greater than that of the baseboard opening, the spring being slidably affixed around the upper shaft end such that the lower spring end impinges the upper trace conductor and the upper spring end impinges the underside of the shaft head, the spring being adapted to urge the upper base connector end against the lower trace conductor;

wherein the base connector can be rotated about its longitudinal axis by rotating the shaft head, and wherein electrical current can be caused to flow through the base connector to the lower trace conductor, through the lower trace conductor to the array of light-emitting electrical units, through the array of light-emitting electrical units to the upper trace conductor, through the upper trace conductor to the coiled spring, through the coiled spring to the shaft, and through the shaft to the downwardly directed electrical contact point; and (b) creating an electrical potential between the sides of the connector post and the central contact post.

10. The illuminating method of claim 9 wherein the light-emitting electrical units are light-emitting diodes.

11. A panel illuminating module described in claim 3 wherein the light-emitting electrical units are electrically arranged in one or more parallel banks.

12. A panel illuminating module described in claim 6 wherein the light-emitting electrical units are electrically arranged in one or more parallel banks.

13. A panel illuminating module described in claim 11 wherein each of the parallel banks comprises a resistor.

14. A panel illuminating module described in claim 12 wherein each of the parallel banks comprises a resistor.

15. The panel illuminating module of claim 11 wherein the module is bi-polar.

16. The panel illuminating module of claim 12 wherein the module is bi-polar.

17. The panel illuminating module described in claim 11 further comprising a full-wave diode bridge rectifier.

18. The panel illuminating module described in claim 1 wherein the means for connecting the light-emitting units in an electrical circuit comprises a spring.

* * * * *